United States Patent [19]

Vorhauer

[11] Patent Number: 4,984,346
[45] Date of Patent: Jan. 15, 1991

[54] AXLE WEDGE REMOVAL TOOL ASSEMBLY

[76] Inventor: Rodney R. Vorhauer, 250 Elmdale Crt., W. Jefferson, Ohio 43162

[21] Appl. No.: 390,976

[22] Filed: Aug. 7, 1989

[51] Int. Cl.$^5$ .................. B25B 27/14; B25B 45/16
[52] U.S. Cl. ............................... 29/277; 29/275; 29/281; 173/128
[58] Field of Search .............. 173/128, 129, 130, 131, 173/132.31, 90; 227/147; 29/275, 277, 281

[56] References Cited

U.S. PATENT DOCUMENTS

| | | |
|---|---|---|
| 1,092,274 | 4/1914 | Lindstedt et al. |
| 2,748,492 | 6/1956 | Lockhart . |
| 2,787,178 | 4/1957 | Matim . |
| 2,829,503 | 4/1958 | Hayes ................................. 173/128 |
| 3,791,034 | 2/1974 | Carver . |
| 4,315,551 | 2/1982 | Iannone ............................. 173/128 |
| 4,548,278 | 10/1985 | Gidlund . |
| 4,637,539 | 1/1987 | Turcott et al. ................ 173/128 X |

Primary Examiner—Hien H. Phan
Assistant Examiner—Willmon Fridie, Jr.
Attorney, Agent, or Firm—Leon Gilden

[57] ABSTRACT

An axle wedge removal tool assembly is set forth utilizing an elongate body formed with a first through-extending bore of a first diameter terminating and removed from a second end with a counter bore threaded internally of a second diameter greater than the first diameter for securement relative to a threaded stud of an axle. An impact tool is utilized with a forward blunt end to cooperate with a forward blunt end of an associated wheel stud whereupon the elongate body, upon securement to a threaded axle stud, aligns the associated impact tool that is secured to an associated impact driver. An axle wedge securing and aligning the stud relative to a hub housing is vibrated loose relative to the hub housing for removal to enable removal of the hub housing relative to an associated wheel assembly.

1 Claim, 1 Drawing Sheet

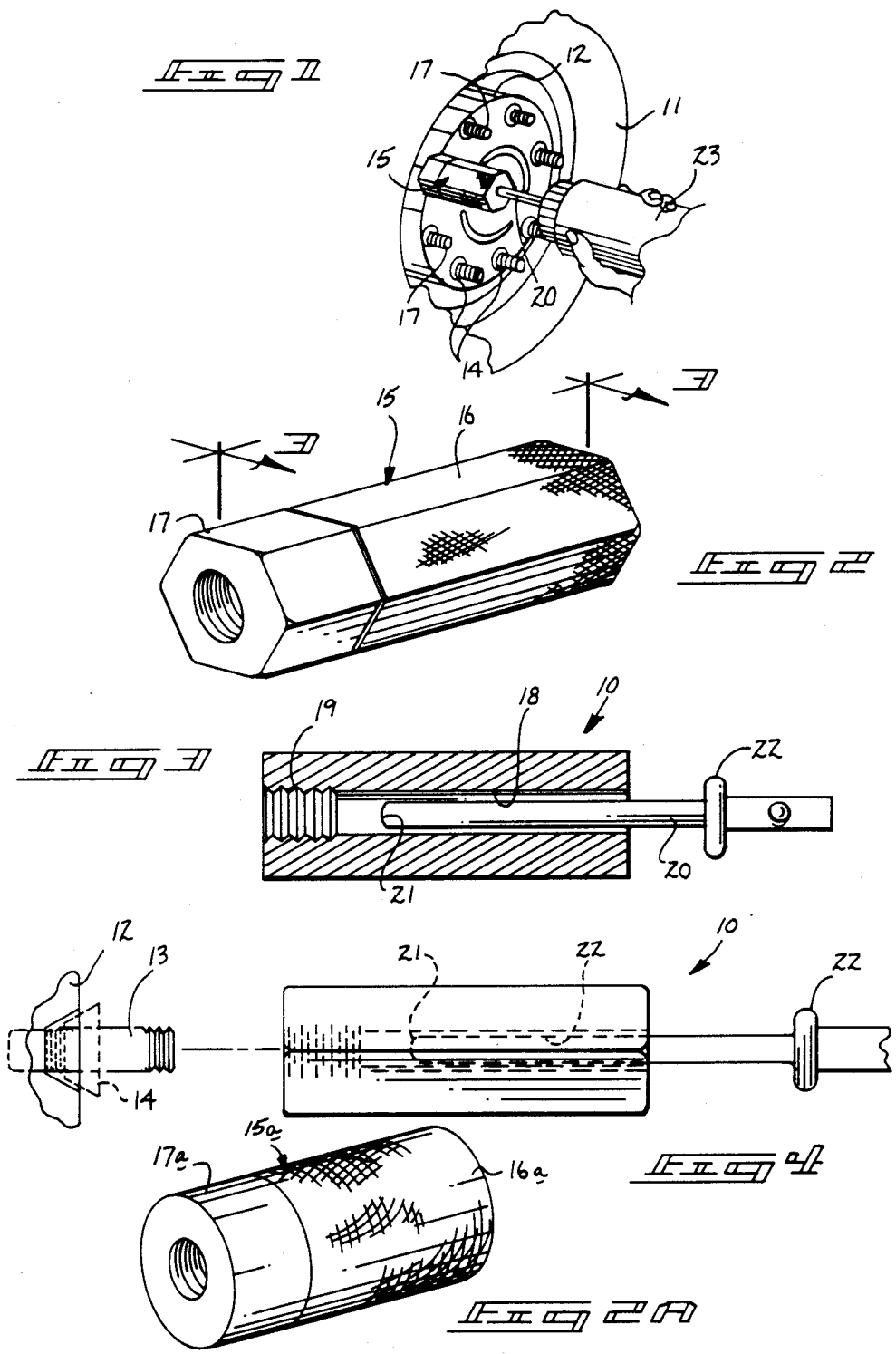

AXLE WEDGE REMOVAL TOOL ASSEMBLY

BACKGROUND OF THE INVENTION

1. Field of the Invention

The field of invention relates to axle removal tools, and more particularly pertains to a new and improved axle wedge removal tool assembly whereupon the same aligns an associated impact tool with a forward blunt end of an axle stud for subsequent removal of the wedge relative to the stud and hub housing of the wheel assembly.

2. Description of the Prior Art

The use of various impact type tools for particular applications is well known in the prior art. The removal of an axle wedge relative to a hub housing in surrounding relationship to one of a series of axle studs aligns and secures the hub housing an axle stud grouping in a relative secure relationship. In subsequent removal of the hub housing and axle in an automotive environment and in particular in use of industrial type trucks, the removal of the wedge has been performed by impacting the axle stud with a suitable tool, such as a sledge hammer. The use of such sledge hammers, while subjecting a user to personal injury and harm, has also the effect of deforming an associated axle stud upon an imprecise impacting of the tool relative to the stud. The instant invention attempts to overcome the deficiencies of the prior art by particularly aligning and maintaining alignment an impact tool relative to an axle threaded stud and positioning such a tool interiorly of the external threaded portion of the stud. Examples of prior art impact tools may be found in U.S. Pat. No. 2,787,178 to Maxim utilizing an impact tool that is formed with a forwardly oriented projecting end, whereupon impacting the tool directs the projected end to a target work piece.

U.S. Pat. No. 2,748,492 to Lockhart sets forth a multi-legged alignment jig that positions a centrally positioned punch relative to a surface to provide a centering depression relative to that surface.

U.S. Pat. No. 3,791,034 to Carver provides a tool for forming apertures whereupon impacting of a rearwardly extending housing directs an impacting punch to a predetermined position within a work piece to form the apertures.

U.S. Pat. No. 1,092,274 to Lindstedt, et al., provides a punching device that a positioned and secured interiorly of a housing to enable the punching of a work piece upon initial alignment of the housing relative to the work piece.

U.S. Pat. No. 4,548,278 to Gidlund provides a power operated tool formed with a shoulder to direct impact forwardly of the tool with a biasing unit to mitigate shock waves resulting from use of the tool.

As such, it may be appreciated that there is a continuing need for a new and improved axle wedge removal tool assembly which addresses both the problems of ease of use and effectiveness in construction, and in this respect, the present invention substantially fulfills this need.

SUMMARY OF THE INVENTION

In view of the foregoing disadvantages inherent in the known types of impact tool apparatus now present in the prior art, the present invention provides an axle wedge removal tool assembly wherein the same aligns and positions an impact tool for use with an impact driver centrally of a forward blunt end of a threaded stud assembly and associated axle to loosen a locking wedge in surrounding relationship of the stud and securing the hub assembly relative to the stud. As such, the general purpose of the present invention, which will be described subsequently in greater detail, is to provide a new and improved axle wedge removal tool assembly which has all the advantages of the prior art impact tools and none of the disadvantages.

To attain this, the present invention includes an elongate body of cylindrical hexagonal external configuration formed with a knurled upper surface and a smooth lower surface to enhance manual grasping of the external surface of the tool for securement about an associated threaded stud of a vehicular axle. The elongate body is formed with a first coaxial bore of a first diameter extending from a first end of the tool and terminating remote from a second end, wherein a counter bore of a diameter greater than the first diameter is formed with internal threads of equal pitch and diameter of an associated axle stud. An impact tool formed with an elongate body and of a diameter complementary of that of the first diameter is slidably received within the first bore and orients a forward blunt end of the impact tool to a forward blunt surface of the threaded stud. The impact tool is securable to an associated impact driver to direct vibrational impact against a forward end of the stud and thereby loosening an associated locking axle wedge relative to the axle stud and axle hub assembly.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved axle wedge removal tool which has all the advantages of the prior art impact tools and none of the disadvantages.

It is another object of the present invention to provide a new and improved axle wedge removal tool which may be easily and efficiently manufactured and marketed.

It is a further object of the present invention to provide a new and improved axle wedge removal tool which is of a durable and reliable construction.

An even further object of the present invention is to provide a new and improved axle wedge removal tool which is susceptible of a low cost of manufacture with regard to both materials and labor, and which accordingly is then susceptible of low prices of sale to the consuming public, thereby making such axle wedge removal tools economically available to the buying public.

Still yet another object of the present invention is to provide a new and improved axle wedge removal tool which provides in the apparatuses and methods of the prior art some of the advantages thereof, while simultaneously overcoming some of the disadvantages normally associated therewith.

Still another object of the present invention is to provide a new and improved axle wedge removal tool assembly wherein the same utilizes an elongate body formed with a threaded forward end to align and slidably accept an impact tool to impart vibrational and impact energy onto a forward end of an associated threaded axle stud.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention in use with an associated wheel hub assembly.

FIG. 2 is an isometric illustration of the elongate body utilized by the instant invention.

FIG. 2a is an isometric illustration of the elongate body utilized by the instant invention of a cylindrical configuration. FIG. 3 is an orthographic view taken along the lines 3—3 of FIG. 2 in the direction indicated by the arrows.

FIG. 4 is an orthographic view taken in elevation of the assembly of the instant invention for securement relative to an axle stud and wedge assembly.

DESCRIPTION OF THE PREFERRED EMBODIMENT

With reference now to the drawings, and in particular to FIGS. 1 to 4 thereof, a new and improved axle wedge removal tool assembly embodying the principles and concepts of the present invention and generally designated by the reference numeral 10 will be described.

More specifically, the axle wedge removal tool assembly 10 essentially comprises use of the assembly for vibratory loosening and dislodging of conically truncated axle wedges 14 positioned in surrounding relationship to associated threaded axle studs 13 directed through a housing hub 12 of a wheel rim assembly 11.

The axle wedges 14 secure and align the associated studs 13 relative to the housing hub and are directed rearwardly in association with an automotive axle (not shown). The assembly 10 includes an elongate body 15 of a generally hexagonal configuration for acceptance of a socket for securement of the body 15 to an associated threaded axle stud 13, or alternatively, the housing may be formed as a cylindrical body 15a. Elongate body 15 is formed with a roughened outer surface 16 or 16a in conjunction with the cylindrical body to enhance manual grasping and assembly and disassembly of the elongate body 15 or 15a relative to an axle stud 13. The lowermost end surface 17 is of a non-roughened exterior surface to enhance cleaning of the surface positioned adjacent an associated axle housing hub 12 to remove grease and the like typically associated with such housings.

The elongate body is formed with a smooth first bore 18 extending from an upper end of the elongate body coaxially thereof and terminating remote from a lowermost end of the elongate body, wherein the smooth first bore is formed of a first diameter. A threaded counter bore 19 is formed with a second diameter greater than that of the first diameter 18, for purposes to be discussed in more detail below. An impact tool 20 is formed of an external diameter substantially equal to that of the first diameter of the smooth first bore 18 to enable sliding and aligned reciprocating motion of the impact tool 20 relative to the smooth first bore 18. The smaller first diameter of the first bore 18 positions a forward blunt end 21 of the impact tool 20 in coaxial association with a forward blunt upper end of an axle stud 13 to prevent distortion of the threaded stud 13 adjacent its external threading and thereby prevent damage to the axle studs 13 that may minimize and lessen their effective life. The impact tool 20 is formed with an impact collar 22 to position and align the tool 20 in association with an impact driver 23.

In use, the impact driver 23 is secured to the impact tool 20 and the forward blunt end 21 of the impact tool is directly against the forward blunt end of an associated threaded axle stud subsequent to securement of the threaded counter bore 19 about an associated threaded stud 13. Upon impacting of the threaded axle stud 13, an associated truncated conically configured axle wedge 14 is loosened and its association between the axle stud 13 and the housing hub 12 to enable its removal As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An axle wedge removal tool assembly for securement to an externally threaded axle stud directed through a hub having a conically truncated axle wedge aligning the axle stud in locking association with the hub housing, the assembly comprising,
   a coaxially aligned elongate body including an upper end spaced from a lower end, the elongate body including securement means adjacent the lower end for securement of the elongate body to the axle stud, and
   an elongate impact tool slidably receivable through the upper end of the elongate body for impacting the tool lower end against an upper end of the stud, and
   wherein the elongate body includes a first coaxially aligned through-extending bore extending in a direction from the upper end to the lower end coextensively through the elongate body and defined by a first diameter, and a threaded counter bore extending in a direction from the lower end and coaxially aligned with and in communication with the first bore and spaced from the upper end defined by a second diameter greater than that of the first diameter and defined by a second length less than that of a first length defined by the first bore, and
   wherein the elongate impact tool is formed of a cylindrical main body of complementary configuration to the first bore to effect alignment of the impact tool relative to the first bore and the counter bore, and
   including a roughened first surface formed exteriorly of the elongate body and extending from the first end to a position remote from the second end, and a smooth external surface extending from the second end formed about the elongate body, and
   wherein the impact tool lower end is blunt for impacting communication with the upper end of the stud, and
   wherein the impact tool includes a collar positioned about the impact tool remote from the blunt end and wherein the impacting tool is securable to an impact driver.

* * * * *